(12) United States Patent
Edmunds

(10) Patent No.: US 8,548,636 B2
(45) Date of Patent: Oct. 1, 2013

(54) ENGINEERED SETPOINTS FOR AUTONOMOUS DISTRIBUTED SENSORS AND ACTUATORS

(75) Inventor: Thomas A. Edmunds, Pleasanton, CA (US)

(73) Assignee: Lawrence Livermore National Secuirty, LLC., Livermore, CA (US)

( * ) Notice: Subject to any disclaimer, the term of this patent is extended or adjusted under 35 U.S.C. 154(b) by 449 days.

(21) Appl. No.: 12/566,869

(22) Filed: Sep. 25, 2009

(65) Prior Publication Data

US 2011/0077753 A1 Mar. 31, 2011

(51) Int. Cl.
*G06F 17/00* (2006.01)
*G05B 11/01* (2006.01)

(52) U.S. Cl.
USPC ............................................. 700/295; 700/19

(58) Field of Classification Search
USPC ............. 700/9, 11, 19, 22, 90, 286, 292, 293, 700/294, 295, 296; 702/57, 60, 61, 64, 65
See application file for complete search history.

(56) References Cited

U.S. PATENT DOCUMENTS

| | | | |
|---|---|---|---|
| 5,814,955 A | 9/1998 | Bauer et al. | |
| 5,878,375 A * | 3/1999 | Newton et al. | 700/292 |
| 6,081,768 A * | 6/2000 | Hu et al. | 700/292 |
| 6,314,378 B1 | 11/2001 | Hodge et al. | |
| 6,738,269 B2 | 5/2004 | Nomiya et al. | |
| 6,850,074 B2 * | 2/2005 | Adams et al. | 702/60 |
| 6,956,305 B2 | 10/2005 | Iwata et al. | |
| 7,010,363 B2 * | 3/2006 | Donnelly et al. | 700/19 |
| 7,149,605 B2 * | 12/2006 | Chassin et al. | 700/295 |
| 7,242,114 B1 | 7/2007 | Cannon et al. | |
| 7,385,373 B2 | 6/2008 | Doruk et al. | |
| 7,415,725 B2 * | 8/2008 | Henneberry et al. | 700/295 |
| 7,420,293 B2 * | 9/2008 | Donnelly et al. | 307/34 |
| 7,957,844 B2 * | 6/2011 | Messing et al. | 700/286 |
| 8,073,573 B2 * | 12/2011 | Chassin et al. | 700/286 |
| 8,396,607 B2 * | 3/2013 | Hirst | 700/295 |
| 2002/0048179 A1 * | 4/2002 | Nomiya et al. | 363/50 |
| 2003/0009302 A1 * | 1/2003 | Leslie | 702/65 |
| 2004/0254654 A1 * | 12/2004 | Donnelly et al. | 700/22 |
| 2004/0254688 A1 * | 12/2004 | Chassin et al. | 700/295 |
| 2006/0007627 A1 * | 1/2006 | Lewis | 361/160 |
| 2006/0095164 A1 * | 5/2006 | Donnelly et al. | 700/295 |
| 2006/0229768 A1 * | 10/2006 | Chassin et al. | 700/295 |
| 2006/0255791 A1 * | 11/2006 | Messing et al. | 324/98 |
| 2007/0055889 A1 * | 3/2007 | Henneberry et al. | 713/186 |
| 2010/0072817 A1 * | 3/2010 | Hirst | 307/31 |
| 2011/0012603 A1 * | 1/2011 | Bose et al. | 324/418 |

* cited by examiner

*Primary Examiner* — Charles Kasenge
(74) *Attorney, Agent, or Firm* — John P. Wooldridge

(57) ABSTRACT

Loads on an electric power system are configured with underfrequency relays in which the frequency setpoints and delay times for reclosure are uniformly distributed. If demand exceeds supply in the system, frequency will decrease. The decrease in frequency will actuate relays and reduce load to the point where demand will meet the available supply. After its engineered delay time, each relay will attempt to close contact and reestablish the load.

10 Claims, 1 Drawing Sheet

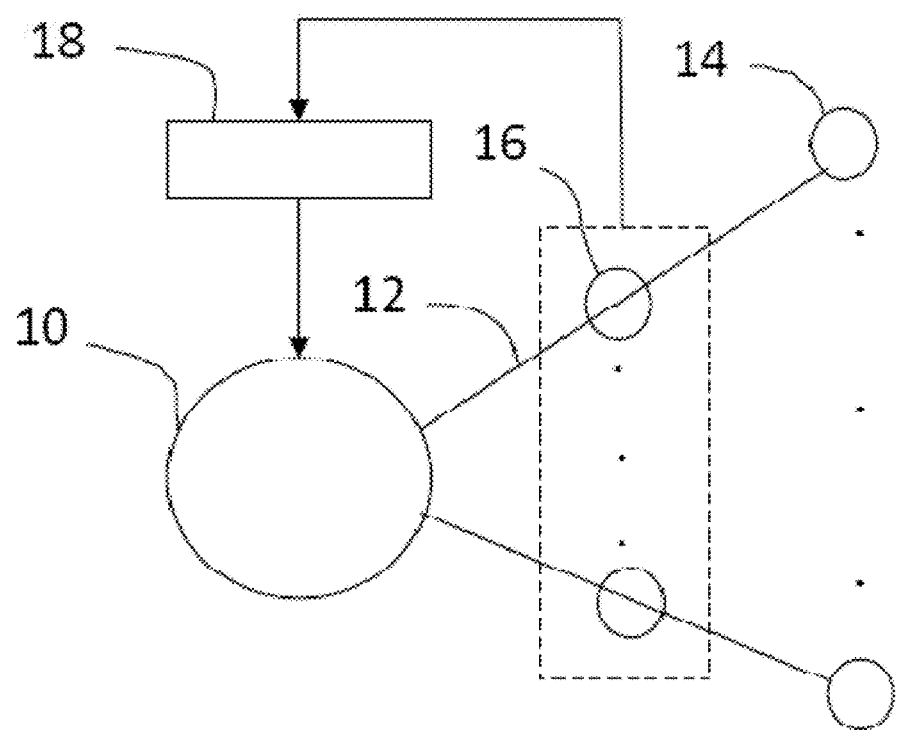

ENGINEERED SETPOINTS FOR AUTONOMOUS DISTRIBUTED SENSORS AND ACTUATORS

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to stability problems associated with large scale controllable supplies such as electrical power, and more specifically, it relates to systems and methods for controlling the demand on such large scale supplies.

2. Description of Related Art

Large scale systems such as electrical power, water and natural gas utilities, characterized by centrally controlled supply and distributed autonomous demand, are typically susceptible to stability problems. In the past, some manual and automated methods have been used for centralized control of electric power demand (as opposed to autonomous demand control). Under-frequency and under-voltage relays have been used to protect power generation equipment on systems, but are not used for demand control.

A key challenge to real time grid control is instability caused either by loss of generation capacity or by loss of electrical load. These losses cause rapid decreases or increases in system frequencies and voltages. The time scales of these system transients are so short that human intervention is often not possible. Accordingly, autonomous frequency and voltage relays currently deployed in transmission and distribution systems typically respond conservatively by shedding more load or generation than may be necessary to stabilize the system. Occasionally unanticipated interactions among them lead to large-scale, protracted blackouts.

Centrally controlled demand response technologies have been proposed under the rubric of homeostatic control. However, no practical and scalable implementations have been realized due in part to the complexity and cost of required communication and control systems.

SUMMARY OF THE INVENTION

It is an object of the present invention to provide a system that uses a population of sensors and actuators for controlling the distributed demand of a plurality of autonomous, dynamic loads connected to a centrally-provided, controllable supply.

Another object is to provide a method that uses a population of sensors and actuators for controlling the distributed demand of a plurality of autonomous, dynamic loads connected to a centrally-provided, controllable supply.

These and other objects will be apparent based on the disclosure herein.

Intervention is frequently required to match supply with demand in large scale systems that have centrally-provided, controllable supply and many distributed autonomous, dynamic loads. Embodiments of the present invention engineer the setpoints of a population of sensors and actuators that control the distributed demand in order to increase the characteristic response time of the system. This allows effective centralized control actions to modify supply and balance the load. In addition, the invention provides negative feedback control that further adds to the stability of the system.

Installation of the sensors and actuators described here are useful to make infrastructure more robust and resistant to attack. In an embodiment of the invention, loads on an electric power system are configured with under-frequency relays in which the frequency setpoints and delay times for reclosure are uniformly distributed. If demand exceeds supply in the system, frequency will decrease. The decrease in frequency will actuate relays and reduce load to the point where demand will meet the available supply. After its engineered delay time, each relay will attempt to close contact and reestablish the load.

In an embodiment of the invention, loads on a natural gas supply system are configured with pressure-sensitive relays in which the pressure setpoints to close a valve and delay times for reopening the value are uniformly distributed. If demand exceeded supply in the system, pressure will decrease. The decrease in pressure will close valves and reduce load to the point where demand will meet the available supply. After its engineered delay time, each valve will attempt to reopen and reestablish the load. Safely considerations involving pilot lights may preclude some applications of this technology.

BRIEF DESCRIPTION OF THE DRAWINGS

The accompanying drawing, which is incorporated into and form a part of the disclosure, illustrates embodiments of the invention and, together with the description, serve to explain the principles of the invention.

FIG. 1 shows a diagram of an exemplary embodiment of the invention.

DETAILED DESCRIPTION OF THE INVENTION

Large scale systems with centrally-provided, controllable supply and many distributed, autonomous, dynamic loads require frequent intervention to match supply with demand. Electricity, natural gas, and water supply networks are examples of such systems. If decentralized, autonomous control actions are taken at distributed loads in an attempt to match supply with demand, the systems may become unstable. For example, if load exceeds demand and distributed, uncoordinated control actions are taken at the load centers, demand may be reduced by too much and supply will then exceed demand. Further control actions would add demand to the systems in an attempt to rebalance the load. The ensuing oscillations may increase in amplitude and lead to catastrophic failure. The problem is particularly acute for systems with time constants that are shorter than the timeframe required for central supply-side control actions.

Embodiments of the present invention engineer the setpoints of a population of sensors and actuators that control the distributed demand in order to increase the characteristic response time of the system. This allows effective centralized control actions to modify supply and balance the load. In addition, the invention provides some degree of negative feedback control that will further add to the stability of the system.

To illustrate the concept, consider two demand control setpoints to configure in this manner: actuation setpoints and delays. The sensors and actuators are configured so that the actuation setpoints for a population of devices is in accordance with a prescribed distribution. For example, the setpoints for a population of relays might be engineered to be uniformly distributed between one and two volts. Other probability distributions are possible. Similarly, delay times for this same population would be set in accordance with other distributions. The net effect of these distributed setpoints and delays is that load would be gradually dropped as the monitored parameter moved through the setpoints region and load would be gradually reestablished within a time frame that would allow central management of the supply.

Each appliance (load) has a sensor and actuator. Referring to FIG. 1, electrical supply 10 provides electricity through line 12 to load 14. Sensor/actuator 16 is connected between supply 10 and load 14. When the sensor portion of 16 detects that the frequency in line 12 is out of a predefined acceptable range, the actuator portion of 16 interrupts the current flow from supply 10 that provides electricity through line 12 to load 14. A delay is built into the actuator. After a predefined delay period, the actuator restores the continuity of the supply line. As long as the sensor registers that the frequency is outside of the set-point range, the actuator will re-interrupt the supply line. In some embodiments, a controller 18 can receive the data from the sensor/actuator. Controller 18 can adjust the supply so that it matches the load.

Embodiments of the invention include the deployment of frequency and/or voltage relays at a massive scale such as on individual appliances in homes and businesses. These relays sense changes in frequency or voltage and respond accordingly. Control actions are autonomous and decentralized rather than a centralized control paradigm. In addition, the setpoints (voltage and frequencies at which control actions are taken) for this large population of relays is randomly configured in some embodiments, using probability distributions that promote system stability.

Frequency and voltage relays suitable for deployment in home appliances are commercially available. For example, under- or over-voltage relays are available for home refrigerators. Relays with pre-determined or customized upper and lower voltage limits can be purchased. In one example of this concept, a refrigerator manufacturer would request a lot of thousands of relays with upper voltage setpoints randomly distributed between two specified bounds and lower voltage setpoints similarly specified. One example of a commercially available under- or over-voltage relay available for home refrigerators at the present is the Goldair brand relay model CVP-110-1. This model could be manufactured, e.g., with overvoltage setpoints uniformly distributed between 124 and 127 volts and undervoltage setpoints uniformly distributed between 94 and 97 volts. These populations of under and over voltage setpoints could be engineered to be independent or correlated if that were advantageous to system stability. Furthermore, the setpoint distributions may be uniform, truncated normal or other desirable distributions. Manufacturing processes would need to be configured to generate units with the requested distributions. The Goldair brand relays are configured to delay restart attempts for three minutes (+/−10%). This delay to restart could also be engineered to a different delay to promote system stability. For example, delays could be engineered to match the time scale of control actions necessary to respond to system upsets on the grid.

In the example above, the refrigerator manufacturer would install the relays and sell them to end users. A "gold star" or other designation may qualify purchasers of the refrigerators for rebates from the local utility in a manner similar to or coordinated with energy efficiency programs. Other high power consumption devices such as air conditioners, electric driers and washers could be similarly equipped with relays. The local utility could track deployments of equipped devices through the rebate programs or by measuring response of electrical demand to disturbances in the system.

The population of relays would tend to introduce a negative feedback loop into the system by delaying the rate of change in system voltage and frequency in response to a system upset. For example, if an electrical generator were to trip off line, electrical demand would immediately exceed generation. Utilities typically keep one generator in load following mode to increase output and make up for lost generation. In fact, regulations require that utilities maintain a minimum amount of spinning reserve to maintain stability. For small, transients, this spinning reserve is sufficient. For larger transients, it is not. It is also expensive to maintain spinning reserve.

The relays would reduce the rate of reduction in system frequency and voltage in this example. As voltage decreased, the refrigerator equipped with the under voltage relay with the highest randomly-selected set point would actuate first and drop the load of the refrigerator. As voltage further decreased, additional relays would open and drop their respective loads. This reduction in load would tend to bring load and generation closer together and reduce the rate of decrease in voltage and frequency. The reduction in load due to these relays would be proportional to the voltage if their set points were uniformly distributed, but could have nonlinear response properties if set points were engineered to be non-uniform. Such non-uniform response may be desirable to improve system stability. (A proportional response may be needed for small transients but more aggressive load reduction may be needed for larger losses of generation.)

As indicated previously, the commercially-available Goldair refrigerator relays would attempt to close and reestablish load after three minutes. Note that if many relays dropped load simultaneously and attempted to reestablish it after three minutes, a periodic demand function would be imposed on the system. This periodic demand could lead to further system instability. By contrast, relays with randomized voltage set points and randomized delay times would impose smaller changes in load on the system over a more protracted time period. This would allow human operators time to make appropriate changes in system configuration.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. A system, comprising
a centrally-provided, controllable supply;
a plurality of autonomous, dynamic loads connected to and presenting a distributed demand on said centrally-provided, controllable supply; and
a population, of sensors and actuators that control said distributed demand, wherein each actuator of said actuators is configured to be actuated at an actuation setpoint, wherein said sensors are configured to sense said actuation setpoint, wherein said actuator is configured to terminate actuation at a prescribed delay time and wherein said prescribed delay time comprises a duration set in accordance with a value drawn from a probability distribution of possible delay times.

2. The system of claim 1, wherein said actuator comprises a relay.

3. The system of claim 2, wherein said relay comprises a frequency relay that senses changes in frequency.

4. The system of claim 2, wherein said relay comprises a voltage relay that senses changes in voltage.

5. The system of claim 1, wherein said centrally-provided, controllable supply is selected from the group consisting of a source of electricity, a source of natural gas and a source of water.

6. A method, comprising:
  providing a utility from a centrally-provided, controllable utility supply to at least one end user load and sensor combination;
  sensing a parameter at said load; and
  disconnecting said supply from said load if said parameter is not within a predefined range of parameters, wherein said load comprises an actuator configured to be actuated at an actuation setpoint, wherein the step of sensing comprises sensing said actuation setpoint, wherein said actuator is configured to terminate actuation at a prescribed delay time and wherein said prescribed delay time comprises a duration set in accordance with a value drawn from a probability distribution of possible delay times.

7. The method of claim 6, wherein said actuator comprises a relay.

8. The method of claim 7, wherein said relay comprises a frequency relay that senses changes in frequency.

9. The method of claim 7, wherein said relay comprises a voltage relay that senses changes in voltage.

10. The method of claim 6, wherein said centrally-provided, controllable utility supply is selected from the group supply the group consisting of it source of electricity, a source of natural gas and a source of water.

* * * * *